Patented Aug. 9, 1927.

1,638,475

UNITED STATES PATENT OFFICE.

WILLIAM COTTON, OF HOCHST-ON-THE-MAIN, GERMANY, ASSIGNOR TO GRASSELLI DYESTUFF CORPORATION, OF NEW YORK, N. Y., A CORPORATION OF DELAWARE.

PROCESS OF OBTAINING FAST-COLORED DISCHARGES ON FAST DYEINGS.

No Drawing. Application filed January 16, 1926, Serial No. 81,831, and in Germany January 19, 1925.

It has already been known for a long time that vat-dyestuffs can be used as colored discharges on dyeings which are obtained by means of azo-dyestuffs. In these discharge styles the dyed ground is, naturally, considerably less fast than the colored discharges used and, moreover, the vat-dyestuffs have the tendency to form halos. Furthermore vat dye stuffs are likewise used as colored discharges on indigo. In this case the dyed ground is also not so fast as the colored discharges printed thereon.

I have now found that a discharge style of unexcelled fastness can be obtained by producing the dyeing by means of vat dyestuffs which are destroyed by a reducing agent such as, for instance, formaldehyde sulfoxylate to which Leucotrope W conc. is added, and by using as colored discharges vat dyestuffs which sufficiently resists the action of the said reducing agent. Leucotrope W conc. is the calcium salt of the disulfonic acid obtained by sulfonating dimethylphenyl-benzyl-ammonium chloride described in Schultz, "Farbstofftabellen" 6th ed., vol. 2, page 200. An essential point in my new process is that only so much of the formaldehyde sulfoxylate with Leucotrope added thereto should be used as is necessary for discharging the dyed ground and for reducing the dyestuff in the colored discharge without destroying it. In the new discharge style the colored discharges obtained by means of vat dyestuffs have the further advantage of forming no halos.

The following examples serve to illustrate my invention:

(1) The material dyed with 4% of indanthrene olive R paste is printed with the following colored discharge:

*Colored discharge.*

130 gr. of indanthrene orange RRT.
600 gr. of standard color.
80 gr. of Leucotrope W conc.
40 gr. of anthraquinone paste.
150 gr. of water.

1 kilo

*Standard color.*

50 gr. of zinc oxide.
30 gr. of glycerine.
30 gr. of dissolving salt B.
200 gr. of wheat-starch tragacanth-thickening.
120 gr. of potassium carbonate.
150 gr. of hydrosulfite N. F. conc. 2 parts hydrosulfite to 1 part of water.

600 grams.

The material is then steamed at 101° C. for 5 minutes in the Mather-Platt ager free from air and then washed and soaped.

(2) The material dyed with 3.3% of indanthrene violet RH paste and 9.3% of indanthrene grey 6 B paste is printed with the following colored discharge and then further treated as indicated in Example 1.

*Colored discharge.*

50 gr. of indanthrene blue 3 G paste fine.
150 gr. of indanthrene yellow G double paste fine.
600 gr. of standard color (prepared as indicated in Example 1.
100 gr. of Leucotrope W conc.
100 gr. of water.

1 kilo (3) The material dyed with 4% of indanthrene brown G paste 7.5% of indanthrene yellow RK paste and 0.5% of indanthrene reddish-violet RK paste is printed with the following discharge and then further treated as indicated in Example 1:

150 gr. of indanthrene violet BN paste fine.
600 gr. of standard color (prepared as indicated in Example 1).
60 gr. of Leucotrope W conc.
190 gr. of water.

1 kilo.

(4) The material dyed with 30% of Helindone fast scarlet B is printed with the following colored discharge and further treated as indicated in Example 1:

200 gr. of indanthrene brilliant blue R paste fine.
600 gr. of standard color (prepared as indicated in Example 1).
80 gr. of Leucotrope W. conc.
120 gr. of water.
_____
1 kilo.

I claim:

1. Process of obtaining fast colored discharges on fast dyeings by using such vat dyestuffs for the dyeings to be discharged as are destroyed by reducing agents with the addition of the calcium salt of the dissulfonic acid obtained by sulfonating dimethylphenyl benzyl ammonium chloride, and by using for the colored discharges such vat dyestuffs as sufficiently withstand the said discharging agents.

2. Material dyed according to the process set forth in claim 1.

In testimony whereof, I affix my signature.

WILLIAM COTTON.